Nov. 23, 1926.  
E. RYDER  
1,607,918  
LIQUID LEVEL INDICATOR  
Filed August 3, 1923

Inventor  
Elmer Ryder

Patented Nov. 23, 1926.

1,607,918

UNITED STATES PATENT OFFICE.

ELMER RYDER, OF BERWYN, ILLINOIS.

LIQUID-LEVEL INDICATOR.

Application filed August 3, 1923. Serial No. 655,398.

This invention relates to liquid level indicators particularly adapted for use on automobiles and other motor vehicles for indicating at all times at the dash or instrument board of the car the amount of fuel contained in the supply tank on the same.

One object of my invention is to provide a double acting means whereby the indicator device at the dash or instrument board will be given a positive movement in both directions as the level of the fuel in the tank varies, and thus accurately register the amount of fuel at all times and under all conditions of use of the car.

A further object of my invention is to compensate for the expansion and contraction of the operating parts of the device due to heat and cold, and thus have an accurate indicator regardless of these changes.

The invention consists further in the matters hereinafter described and more particularly set forth in the appended claims.

In the accompanying drawings—

Figure 1:
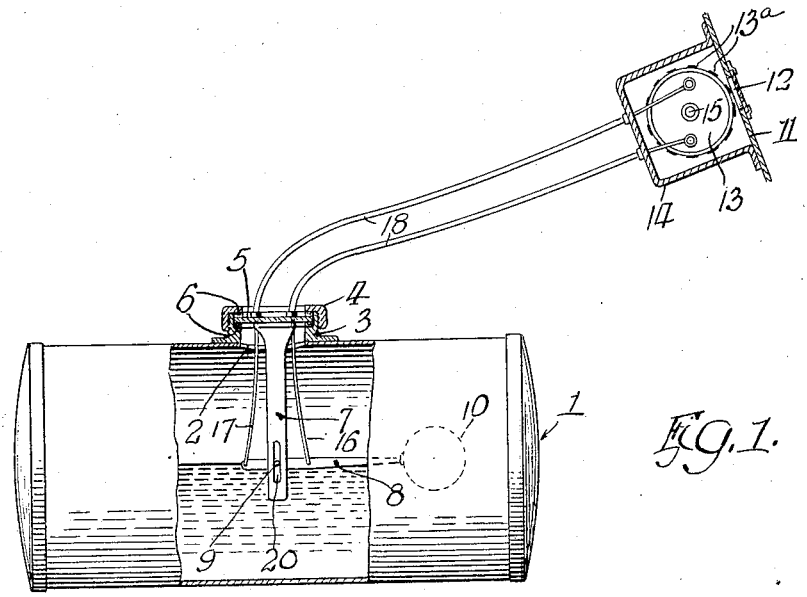
Fig. 1 shows the indicator of my invention applied to a fuel tank of a motor vehicle.
Figure 2:
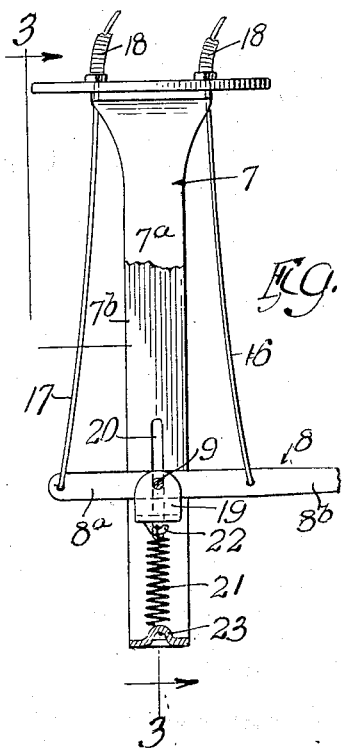
Fig. 2 is an enlarged side view of that part of my mechanism located in the tank.

In the drawings, the tank 1 has an opening 2 in its top wall surrounded by an upstanding neck 3. Said neck 3 is secured to the tank by solder or otherwise and is threaded to receive a ring nut 4 for clamping over the upper end of the neck 3 a closure disc or cap plate 5. Said cap plate 5 is seated between gaskets 6, as shown in Fig. 1, to provide a leak proof joint.

The disc or cap 5 carries a depending bracket 7. This extends down into the tank 1 through the neck 3 and terminates short of the bottom wall of said tank, as shown in Fig. 1. Arranged transverse to the bracket 7 and extending across the same is an arm 8. Said arm 8, by a pin 9, has pivotal connection between its ends with the bracket 7 and is arranged to have its shortest section $8^a$ on one side of the bracket 7 and its longest section $8^b$ on the opposite side of the same. The longest section $8^b$ carries a float 10 to swing the arm 8 vertically on its pivot 9 as the level in the tank 1 varies.

In Fig. 1, I have shown the dash or instrument board 11 of a car. In this board is a slot 12 constituting a sight opening for the numbers or other indicating data $13^a$ on the face of a rotary member 13 behind the same. Said member 13 is part of the indicating means and is housed in a protective case 14 secured by bolts or otherwise to the rear side of the board 11. Said member 13 is mounted for rotation on a shaft 15.

Extending between the arm 8 and rotary member 13 are two members, preferably in the form of wires 16, 17. These wires are on opposite sides of the bracket 7 and are connected, respectively, with the arm sections $8^a$, $8^b$, preferably at substantially equal distances from the pivot 9. The connection is made by passing the lower ends of the wires through openings in these arm sections and then bending the wires upward to form hooks, as shown. The other ends of these wires are connected by pins with the rotary member 13 on opposite sides of its axis 15. Between the disc 5 and the case 14, the wires 16, 17 run through protective sleeves or coverings 18, 18. If desired, the usual Bowden wires may be employed.

As the liquid level in the tank 1 falls, due to fuel consumption, the float 10 swings the arm 8 downward. This causes the arm section $8^a$ to rise and the section $8^b$ to be lowered, creating a pull and a push, respectively, on the rotary member 13. The latter by this movement is turned in a direction to register a decreasing amount of fuel in the tank by its data $13^a$ at the sight opening 12. On a rise of the float 10, on filling the tank, the arm section $8^a$ is lowered while the arm $8^b$ is raised, likewise creating a pull and a push on the member 13 to turn it in the opposite direction and show that the tank is full. By this means, the indicating member 13 is turned positively in both directions, thus avoiding the use of springs as heretofore and making an accurate indicator.

Figure 3:
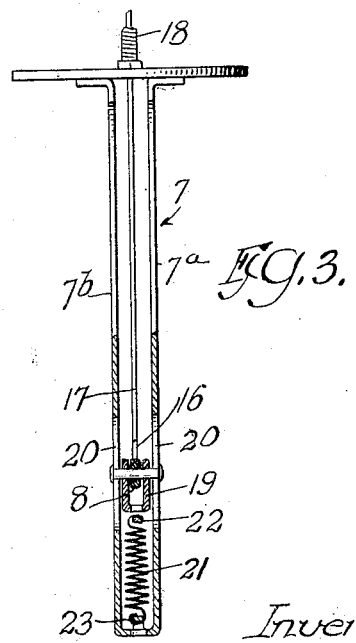
Fig. 3 is a vertical section on the broken line 3—3 of Fig. 2.

To compensate for expansion and contraction of the wires 16, 17 under heat and cold, I make the bracket 7 of two vertical parts $7^a$, $7^b$, spaced apart as shown in Fig. 3. This may be done by making the bracket from a strip of metal bent substantially U-shape in form. In the space between the parts $7^a$, $7^b$, I locate a U-clip or piece 19 in which is pivoted the arm 8 by the pin 9. The ends of the pin 9 project beyond the clip 19 and are slidably received in vertically elongated slots 20, 20 in the bracket sections $7^a$, $7^b$.

The ends of said pin 9 are enlarged or headed outside said slots to hold the pin therein. Below the clip 19 is a coiled spring 21 connected at its upper end with a hook 22 carried by the clip 19. The lower end of the spring 21 is at the lower end of the bracket 7 and is connected with a loop piece 23 provided at said bracket end. The spring 21 exerts a constant downward pull on the clip 19.

When the wires 16, 17 shorten by contraction, the spring 21 allows the pin 9 to give upward, and on lengthening of said wires by heat the pin 9 lowers. Pivotal function of the pin is not hindered or retarded because of the slots 20, 20. Thus, with the structure described, expansion and contraction of the wires does not hinder accurate operation of the indicator 13. Moreover, the bracket 7 and arm 8 being carried by the disc 5, makes possible the application of my device to a car already in use, this being done by inserting the parts through the neck provided for the usual float gage now in use in most tanks and clamping the disc 5 in said neck.

While I have shown and described in detail herein a liquid level indicator of my invention, it is of course understood that the details of construction and arrangement of parts may be variously changed and modified without departing from the spirit and scope of my invention.

I claim as my invention:

1. The combination with a liquid level indicator, of a tank spaced therefrom, a bracket carried by and extending into said tank, a float actuated arm extending across said bracket and pivoted thereto, two wires connecting the arm on opposite sides of its pivot with the indicator for operating the same, and means providing a yieldable pivotal connection between the arm and bracket for compensating for expansion and contraction of the wires.

2. The combination with a liquid level indicator, of a tank spaced therefrom, a bracket carried by and extending into said tank and having two spaced upright sections, the latter having vertically elongated slots therein, a float actuated arm extending acrosss and between said sections and having a pivot pin extending into said slots, two wires connecting the arm on opposite sides of its pivot at equal distances therefrom with said indicator for operating the same, and a spring exerting a downward force on said arm.

3. The combination with a liquid level indicator, of a tank spaced therefrom, a bracket carried by and extending into said tank, said bracket having two spaced upright sections the latter having vertically elongated slots therein, a float actuated arm extending across and between said sections, a clip on said arm at the sections, a pivot pin connecting the clip and arm and extending into said slots, and a coiled spring pulling downward on the arm and connected with the bracket and clip, respectively.

4. An attachment for liquid containing tanks, comprising a plate provided with openings, a bracket carried by and depending from said plate, an arm extending across said bracket, a float carried by said arm, two wires extending through the openings in said plate, said wires being connected with said arm on opposite sides of said bracket, and means providing a yieldable pivotal connection between said arm and bracket intermediate said wires for compensating for expansion and contraction of said wires.

In testimony that I claim the foregoing as my invention, I affix my signature this 28th day of July, 1923.

ELMER RYDER.